Jan. 30, 1945. G. E. COXON 2,368,289
INDICATOR
Filed Dec. 29, 1941
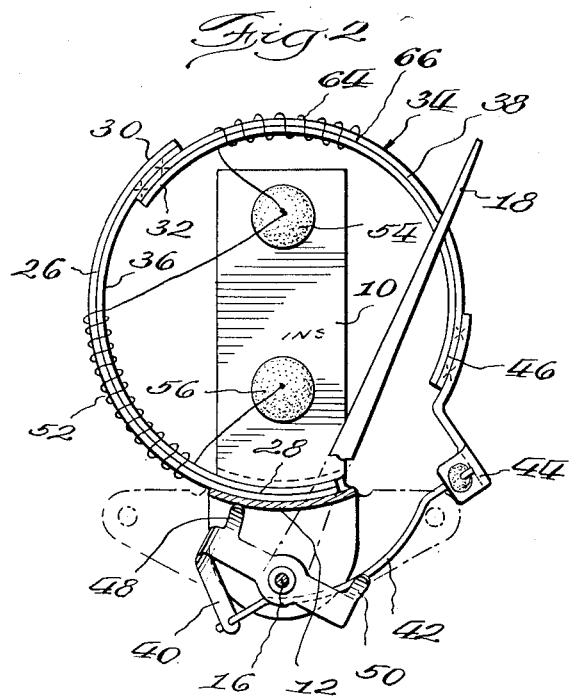
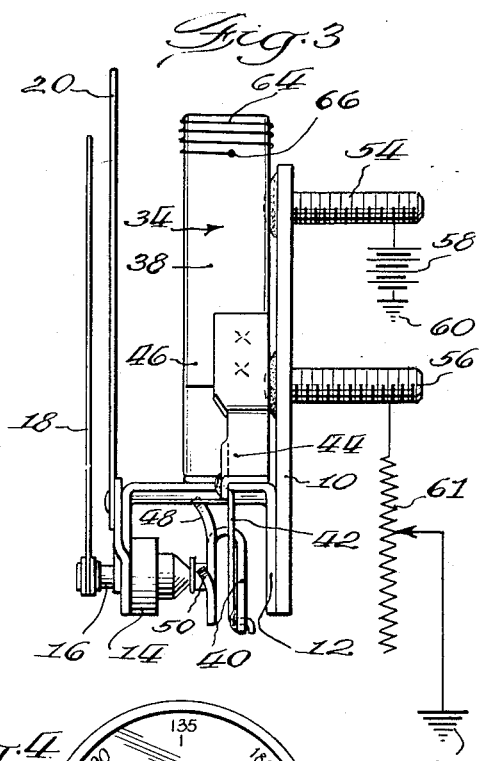
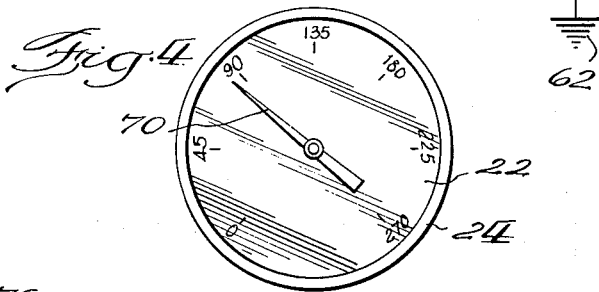
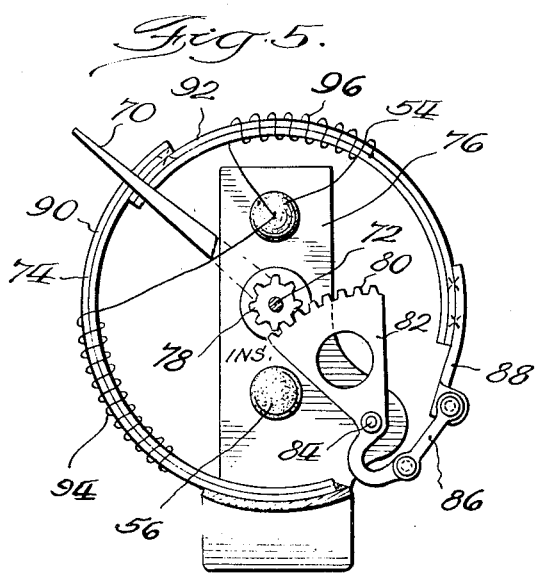
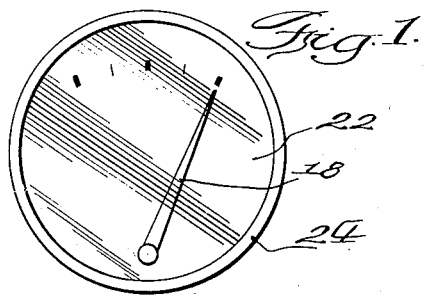
Inventor
George E. Coxon
By
Williams, Bradbury & Hinkle
Attys Patented Jan. 30, 1945

2,368,289

UNITED STATES PATENT OFFICE 2,368,289

INDICATOR

George E. Coxon, Cicero, Ill., assignor to Stewart-Warner Corporation, Chicago, Ill., a corporation of Virginia Application December 29, 1941, Serial No. 424,807

8 Claims. (Cl. 171—95)

My invention pertains to indicators and more particularly to a thermal type receiver unit for an indicator of the kind commonly used on automobiles to show the oil pressure in the engine oiling system, to show the temperature of the engine cooling liquid, to show the quantity of gasoline in the main fuel tank, and for similar purposes.

An object of my invention is to provide an indicator of the class described which is more accurate than those now in use.

Another object of my invention is to provide an indicator which may be manufactured more quickly and economically than the indicators now in use.

Another object of my invention is to provide an indicator which is of simple and rugged construction and which will provide long and trouble-free service.

Other objects of my invention will become apparent as the description proceeds.

In the drawing:

Fig. 1 is a front view of an indicator embodying one form of my invention;

Fig. 2 is a view on an enlarged scale looking in the same direction as Fig. 1, but with parts removed to show more clearly the internal construction;

Fig. 3 is a side elevation of the indicator of Fig. 1 on an enlarged scale and showing the electrical connections diagrammatically;

Fig. 4 is a front view of a modified form of my invention; and

Fig. 5 is an enlarged view of the indicator of Fig. 4 with parts removed to show the internal construction.

Referring particularly to Figs. 1, 2, and 3, it will be seen that I have provided an indicator receiving unit having a base 10 preferably formed of insulating material and adapted for mounting on the instrument board of an automobile or any other suitable support. A sheet metal bracket 12 is attached to the support and provides a bearing 14 for a pointer shaft 16 having a pointer 18.

The pointer is located in juxtaposition to a dial 20 carrying suitable indicia as clearly indicated in Fig. 1, it being understood, of course that the particular indicia will vary for different uses of the instrument. The pointer and dial are preferably protected by a glass face plate 22 held in place by a protecting metal rim 24.

An arcuate bimetallic strip 26 has one end 28 rigidly secured to the bracket 12, and a second end 30 welded or otherwise suitably secured to the end 32 of a second arcuate bimetallic strip 34. The bimetallic strip 26 may be referred to as the actuating strip, and has its high expansion side 36 forming the inner side of the arc so that heating of the strip tends to increase the radius of curvature of this strip. The compensating bimetallic strip 34 has its high expansion side 38 on the outside of the arc so that heating of this strip tends to reduce the radius of curvature of its arc. The free length of the strip 26 is equal to that of the strip 34 so that the combined strips automatically compensate for variations in ambient temperature.

The pointer shaft 16 has an actuating arm 40 connected by link 42 to bracket 44 welded or otherwise secured to the free end 46 of bimetallic strip 34. The actuating arm 40 is provided with stop fingers 48 and 50 and these stop fingers are adapted to engage the bracket 12 to determine the extreme positions of the pointer 18.

An actuating coil 52 is wound around the actuating bimetallic strip 26. One end of this coil is connected to battery terminal 54 and the other end to rheostat terminal 56. As clearly shown in Fig. 3, battery terminal 54 is adapted to be connected to a battery 58 or other suitable source of electrical energy which is grounded at 60.

Rheostat terminal 56 is adapted to be connected to a rheostat 61 or other resistance which varies with the characteristic to be indicated and such rheostat is grounded at 62.

A voltage compensating coil 64 is wound about the compensating strip 34. One end of the coil 64 is connected to battery terminal 54, and the other end of this coil is grounded to bimetallic strip 34 as indicated at 66. It will be understood by those skilled in the art that the bracket 12 is grounded either by the means for attaching the instrument to the instrument board of the automobile, or by a special ground connection.

The operation of this form of my invention is as follows: In Figs. 1 and 2 the pointer is shown at the zero or lower end of the scale and this position corresponds to a maximum resistance of the rheostat 61 and a minimum current in the actuating coil 52. Any changes in ambient temperature will produce no shift in the position of the pointer 18, since the arrangement of the bimetallic strips 26 and 34 automatically compensates for variations in ambient temperature for all positions of the pointer 18.

Any variation in battery voltage will vary the current flowing through the coil 52 and would shift the position of the pointer 18 so that it no longer corresponded to the characteristic to be indicated, unless some voltage compensating means is provided. Such variation in battery voltage will also vary the current in the coil 64 and the current variation in the compensating coil 64 produces a change in curvature in the bimetallic strip 34, which compensates for the change in curvature in the bimetallic strip 26, resulting from the effect of voltage variations on the current in coil 52.

When the resistance of the rheostat 61 is reduced, a greater current flows through the actuating coil 52, whereby the actuating bimetallic strip 26 is heated to a higher temperature and increases its radius of curvature. This shifts the position of the pointer 18 and accurately reflects the change in the characteristic being indicated which was responsible for the change in rheostat resistance. The pointer 18 thus at all times and for all conditions of ambient temperature and battery voltage accurately indicates the true condition of the volume of gasoline in the fuel tank or other characteristic being indicated.

When the form of my invention shown in Figure 1 is first completed and tested, it can be calibrated very easily by simply bending the arm 40, bracket 44 and stop fingers 48 and 50 so that the pointer moves over the full range of the indicia for full variation in rheostat resistance. The parts to be bent for calibration purposes are preferably made of a material which will permit such bending without breaking, and are sufficiently rigid to retain their bent positions throughout the life of the indicator.

In Figs. 4 and 5 I have shown a modified form of my invention which has the advantage of providing a much greater range of pointer movement. In this form of my invention the pointer may move over a scale occupying the entire 360° of permissible pointer movement.

In this form of my invention the pointer 70 is mounted on a shaft 72 which is located centrally of the thermal ring 74 and is supported in a bearing in the base 76.

A pinion 78 is attached to the shaft 72 and this pinion is driven by an arcuate rack 80 on one end of a driving member 82 pivotally mounted at 84 on the base 76.

A link 86 pivotally connects one end of the driving member 82 with a bracket 88 secured to the free end of the thermal ring 74. This ring comprises bimetallic strips 90 and 92 arranged back to back as in the previous embodiment. An actuating coil 94 surrounds bimetallic strip 90 and a voltage compensating coil 96 surrounds bimetallic strip 92.

The construction and operation of that form of my invention shown in Figs. 4 and 5 is essentially the same as the construction and mode of operation of the previous embodiment. The principal difference resides in the mounting of the pointer shaft and the interposition of gearing between the pointer shaft and free end of the thermal ring, whereby the pointer may travel over a range of movement of 360° or any part thereof. The embodiment of Figs. 4 and 5 is likewise provided with a battery terminal 54 and a rheostat terminal 56 and is designed to be connected in an electric circuit like that diagrammatically indicated in Fig. 3.

It will be understood that my invention is not limited to the particular details illustrated and described, but may assume numerous other forms and that the scope of my invention is defined in the following claims.

I claim:

1. In an indicator of the class described, the combination of a first indicating member, a second indicating member movable relative to said first member to indicate variations in a given characteristic, a pair of arcuate bimetallic strips, each having a high expansion side and a low expansion side, said strips being connected so that the high expansion side of one strip is on the inner side of its arc whereas the high expansion side of the other strip is on the outer side of its arc, a rigid support for one end of said connected strips, said other end of said connected strips being free to move relative to said support, a connection between the free end of said connected strips and said second member, and means for variably heating one of said strips.

2. In a device of the class described, the combination of a pair of arcuate bimetallic strips connected so that the high expansion side of one strip is on the outside of its arc and the high expansion side of the other strip is on the inside of its arc, a fixed support for one end of said connected strips, the other end of said connected strips being free to move relative to said support, means for variably heating one of said strips, and indicating means connected to the free end of said connected strips for operation thereby.

3. In a device of the class described, the combination of a pair of bimetallic strips each having a high expansion side and a low expansion side, said strips being connected so that the high expansion side of one strip constitutes a continuation of the low expansion side of the other strip and the low expansion side of the first strip constitutes a continuation of the high expansion side of said other strip, a fixed support for one end of said connected strips, the other end of said connected strips being free to move relative to said support, an actuating heating coil for heating one of said connected strips, said actuating coil being adapted for connection to a resistance variable in response to variations in a given characteristic whereby the current in said coil varies with said characteristic, a voltage compensating heating coil for the other strip, and indicating means connected to the free end of said connected strips.

4. In an indicator of the class described, the combination of a first indicating member, a second indicating member movable relative to said first member to indicate variations in a given characteristic, a pair of thermal strips connected so that the strips constitute continuations of each other and the high expansion side of one strip constitutes a continuation of the low expansion side of the other strip, said thermal strips having the same effective length and the same configuration, a rigid support for one of said connected strips, the other end of said connected strips being free to move relative to said support, a connection between the free end of said connected strips and one of said members, and means for variably heating one of said strips.

5. In a device of the class described, the combination of a pair of arcuate thermal strips each having a high expansion side and a low expansion side, said strips being connected in overlapping relationship with a side of one strip in contact with the like side of the other strip, a rigid support for one end of said connected strips, the other end of said connected strips being free to move relative to said support, means for variably heating one of said strips, and indicating means connected to said strips for operation thereby.

6. In a device of the class described, the combination of a pair of thermal strips each having a high expansion side and a low expansion side and connected in overlapping relationship with a side of one strip in contact with the like side of the other strip, a rigid support for one end of said connected strips, the other end of said connected strips being free to move relative to said support, an actuating heating coil for heating one of said strips, said actuating coil being adapted for connection to a resistance variable with a given characteristic whereby the current in said coil is varied in accordance with variations in said characteristic, a voltage compensating heating coil for the other strip, and indicating means connected to said strips for actuation thereby.

7. In an indicator of the class described, the combination of a dial, a pointer movable relative to said dial to indicate variations in a given characteristic, a pair of arcuate bimetallic strips connected to each other, one of said strips having its high expansion side on the outside of its arc and the other of said strips having its high expansion side on the inside of its arc, a rigid support for one end of said connected strips, gearing connecting the other end of said strips and said pointer, the other end of said connected strips being free to move relative to said support, and means for variably heating one of said strips.

8. In a device of the class described, the combination of a pair of thermal strips each having a high expansion side and a low expansion side and connected so that the low expansion side of one strip constitutes a continuation of the high expansion side of the other strip and the high expansion side of the first strip constitutes a continuation of the low expansion side of said other strip, a fixed support for one end of said connected strips, the other end of said connected strips being free to move relative to said support, electrical means for variably heating each of said strips, a rheostat in series with one of said electrical means, and indicating means connected to the other end of said strips for operation thereby.

GEO. E. COXON.